United States Patent
Hsieh et al.

(10) Patent No.: US 9,810,582 B2
(45) Date of Patent: Nov. 7, 2017

(54) TEMPERATURE MEASURING BOARD DEVICE AND TEMPERATURE MEASURING BOARD THEREOF

(71) Applicant: WISTRON CORPORATION, New Taipei (TW)

(72) Inventors: Hao-Chun Hsieh, New Taipei (TW); Hsin-Lun Tsai, New Taipei (TW); Kaun-Chang Wu, New Taipei (TW)

(73) Assignee: Wistron Corporation, New Taipei (TW)

(*) Notice: Subject to any disclaimer, the term of this patent is extended or adjusted under 35 U.S.C. 154(b) by 588 days.

(21) Appl. No.: 14/509,565

(22) Filed: Oct. 8, 2014

(65) Prior Publication Data

US 2015/0323393 A1 Nov. 12, 2015

(30) Foreign Application Priority Data

May 6, 2014 (TW) .............. 103116098 A

(51) Int. Cl.
  *G01K 1/16* (2006.01)
  *G01K 1/14* (2006.01)
  *G01K 13/00* (2006.01)
  *G01K 7/02* (2006.01)
  *G01K 1/20* (2006.01)

(52) U.S. Cl.
  CPC .............. *G01K 1/14* (2013.01); *G01K 1/20* (2013.01); *G01K 7/02* (2013.01); *G01K 7/021* (2013.01); *G01K 13/00* (2013.01)

(58) Field of Classification Search
  USPC ........................ 374/134, 141, 208
  See application file for complete search history.

(56) References Cited

U.S. PATENT DOCUMENTS

| 6,062,728 A * | 5/2000 | Breunsbach | G01K 3/04 340/870.17 |
| 2016/0178450 A1* | 6/2016 | Trifonov | G01K 7/01 374/183 |

FOREIGN PATENT DOCUMENTS

CN 101098617 A 1/2008

OTHER PUBLICATIONS

Translation of CN101098617 (Jan. 2, 2008).*
The Office Action issued to Chinese Counterpart Application No. 201410214318.X by the SIPO dated Aug. 21, 2017, with an English translation of sections boxed.

* cited by examiner

*Primary Examiner* — Mirellys Jagan
(74) *Attorney, Agent, or Firm* — The Mueller Law Office, P.C.

(57) ABSTRACT

A temperature measuring board for use in measuring an oven temperature of a reflow oven includes a modular substrate and a thermal compensation unit. The modular substrate includes a plurality of substrates assembled to each other. Each substrate has at least one first fixing portion, and at least one second fixing portion removably fixed to the first fixing portion of another substrate. A selected number of the substrates can be assembled to each other to form a desired shape of the modular substrate through engagement of the first and second fixing portions. The thermal compensation unit includes at least one surface-measured compensation member fixed to the modular substrate at a selected location.

22 Claims, 7 Drawing Sheets

TEMPERATURE MEASURING BOARD DEVICE AND TEMPERATURE MEASURING BOARD THEREOF

CROSS REFERENCE TO RELATED APPLICATION

This application claims priority of Taiwanese Patent Application No. 103116098, filed on May 6, 2014.

BACKGROUND OF THE DISCLOSURE

1. Field of the Disclosure

The disclosure relates to a temperature measuring board, more particularly to a temperature measuring board for measuring an oven temperature of a reflow oven and a temperature measuring board device having the temperature measuring board.

2. Description of the Related Art

In the manufacturing process of the printed circuit board (PCB), soldering is the key to the quality of the surface mount technology (SMT). An important factor affecting the quality of the soldering is whether the temperatures of a circuit board substrate and surface mount device (SMD) components can be accurately measured and regulated.

In order to control an oven temperature of a reflow oven, a temperature measuring board is placed in the reflow oven to measure the oven temperature. There are many temperature measuring boards available in the market at present, however, each temperature measuring board has a fixed shape, so that it can only measure an average oven temperature in the reflow oven. Because different printed circuit boards have different sizes, shapes, hole designs, and surface mount component layouts, even though when placed in the same reflow oven, the temperature at different locations of the board surface is not the same. The existing temperature measuring board cannot measure the temperature at different locations of the different printed circuit boards, and cannot simulate the components on the printed circuit board for conducting temperature measurement.

Currently, to accurately measure the temperature at different locations of the printed circuit board, an actual printed circuit board sample is used. However, not only is the printed circuit board wasted, but also, because of the sandwich structure of the printed circuit board, the sandwich structure is likely to be segregated after repeated baking, so that it can no longer accurately reflect the temperature of the printed circuit board during baking. Hence, there is still room for improving the existing temperature measuring board used for the reflow oven and the method of temperature measurement.

SUMMARY OF THE DISCLOSURE

Therefore, an object of the disclosure is to provide a temperature measuring board that can accurately simulate each different printed circuit board to measure an oven temperature of a reflow oven.

Another object of this disclosure is to provide a temperature measuring board that can simulate measuring the temperature of each location and each component on a printed circuit board.

Still another object of this disclosure is to provide a temperature measuring board that can withstand multiple baking and that is not easily damaged.

Yet another object of this disclosure is to provide a temperature measuring board device that has the aforesaid temperature measuring board.

According to one aspect of this disclosure, a temperature measuring board for use in measuring an oven temperature of a reflow oven comprises a modular substrate and a thermal compensation unit. The modular substrate includes a plurality of substrates assembled to each other. Each of the substrates has at least one first fixing portion, and at least one second fixing portion removably fixed to the first fixing portion of another one of the substrates. A selected number of the substrates can be assembled to each other to form a desired shape of the modular substrate through engagement of the first and second fixing portions. The thermal compensation unit includes at least one surface-measured compensation member fixed to the modular substrate at a selected location.

Preferably, the thermal compensation unit further includes at least one stacked-layered compensation member removably fixed to the modular substrate at a selected location. The temperature measuring board further comprises at least one retaining mechanism for removably retaining the stacked-layered compensation member to the modular substrate.

Preferably, the retaining mechanism includes at least one threaded rod extending through the modular substrate, and a screw hole formed in the stacked-layered compensation member for threaded engagement with the threaded rod.

Preferably, the stacked-layered compensation member is a metal piece fitted to the modular substrate.

Preferably, each of the substrates is plate-shaped, and the first and second fixing portions are formed on two lateral sides of a corresponding substrate.

Preferably, the first fixing portion is an engaging groove extending inwardly from a lateral side of a corresponding one of the substrates, and the second fixing portion is an engaging rib protruding from another lateral side of the corresponding the substrate and releasably engaging the engaging groove in an adjacent one of the substrates.

Preferably, the modular substrate has a thermal decomposition temperature greater than 320° C., a glass transition temperature greater than 170° C., and a thermal expansion coefficient smaller than 0.0002 m/° C.

Preferably, the material of the modular substrate is one of FR-4 epoxy glass fiber and Stononlead.

According to another aspect of this disclosure, a temperature measuring board device for use in measuring an oven temperature of a reflow oven comprises a temperature measuring board and a fixture. The temperature measuring board includes a modular substrate and a thermal compensation unit. The modular substrate includes a plurality of substrates assembled to each other. Each of the substrates has a first engaging portion. The thermal compensation unit includes at least one surface-measured compensation member fixed to the modular substrate at a selected location. The fixture is used for supporting and fixing the temperature measuring board, and includes a main body and a plurality of second engaging portions disposed on the main body. The first engaging portion of each of the substrates is removably engaged to a corresponding one of the second engaging portions. A selected number of the substrates can be assembled to the fixture to form a desired shape of the modular substrate.

Preferably, each of the substrates is plate-shaped, and the first engaging portion is a groove extending inwardly from a side of a respective one of the substrates that is adjacent to the fixture. Each of the second engaging portions is an abutment stud that projects from the main body and that is engaged to the groove of a corresponding the substrate.

Preferably, the groove receives a portion of the thermal compensation unit, and each of the substrates further has at least one wire organizing notch that communicates the groove with an ambient environment and that is registered with the wire organizing notch of an adjacent one of the substrates.

Preferably, the fixture is formed with a plurality of through holes extending through the main body.

The efficiency of this disclosure resides in that by using the modular substrate having a plurality of the substrates and by using the coordination of the first and second fixing portions and/or the coordination of the first and second engaging portions, the substrates can be fixedly assembled to each other and/or to the fixture using a selected number of the substrates to achieve a desired shape of the modular substrate. Through this, the modular substrate can simulate accurately and correspondingly printed circuit boards (not shown) of various sizes, shapes and thicknesses for conducting an oven temperature measurement. Further, through the disposition of the surface-measured compensation members, the temperature measuring board is able to simulate measurement of the oven temperature and affection of each electronic component on the printed circuit board. Moreover, because of the structure and material properties of the modular substrate, the modular substrate can withstand many times of repeated baking without being damaged.

BRIEF DESCRIPTION OF THE DRAWINGS

Other features and advantages of the present disclosure will become apparent in the following detailed description of the preferred embodiment with reference to the accompanying drawings, of which.

DETAILED DESCRIPTION OF THE PREFERRED EMBODIMENT

Figure 1:
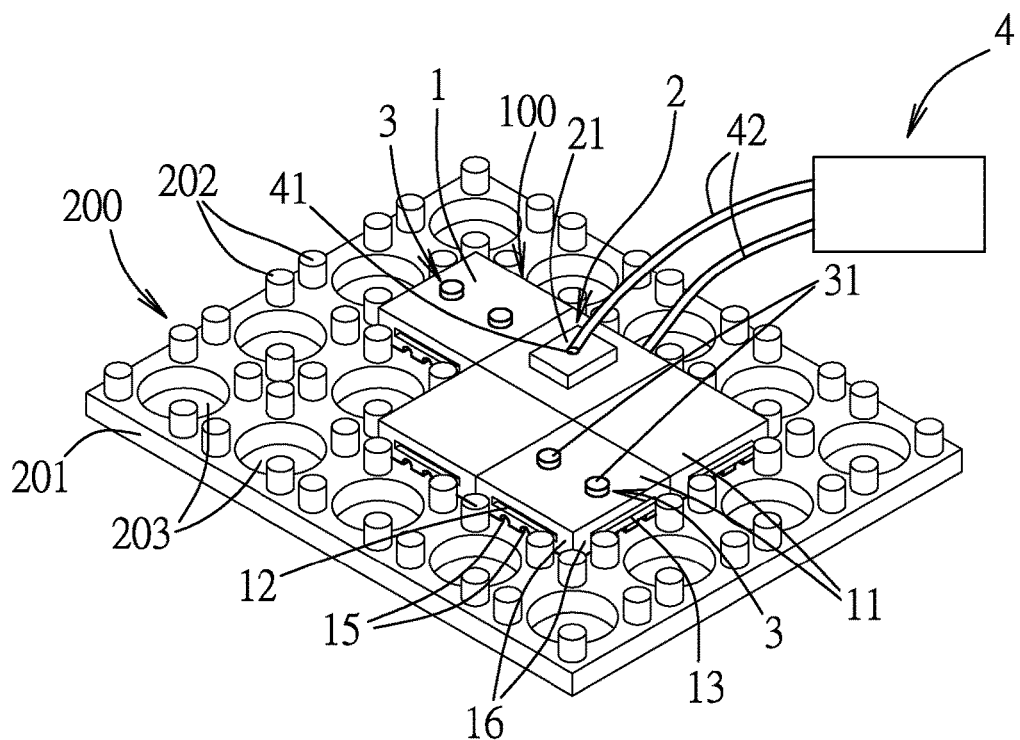
FIG. 1 is a perspective view of a temperature measuring board device according to the preferred embodiment of the disclosure.
Figure 2:
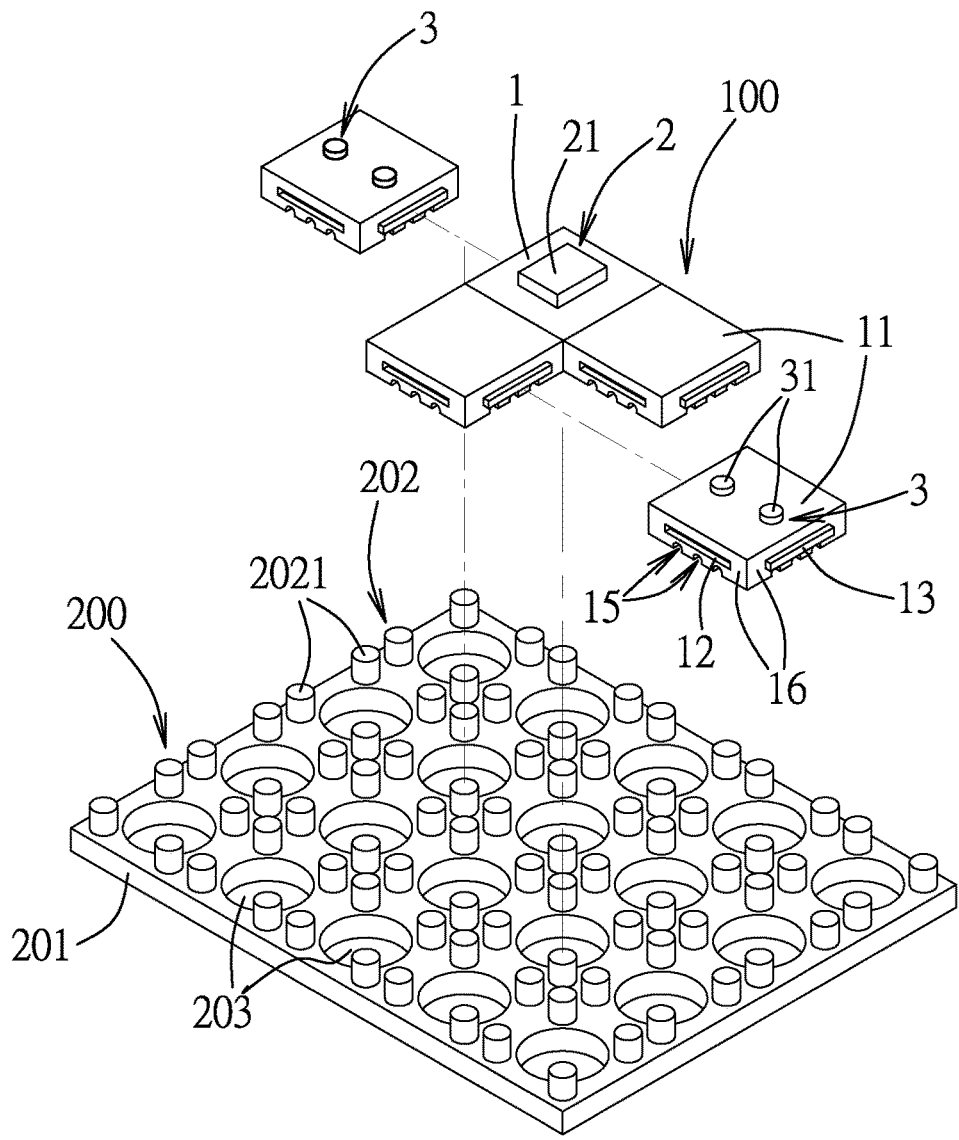
FIG. 2 is an exploded perspective view of the preferred embodiment.
Figure 3:
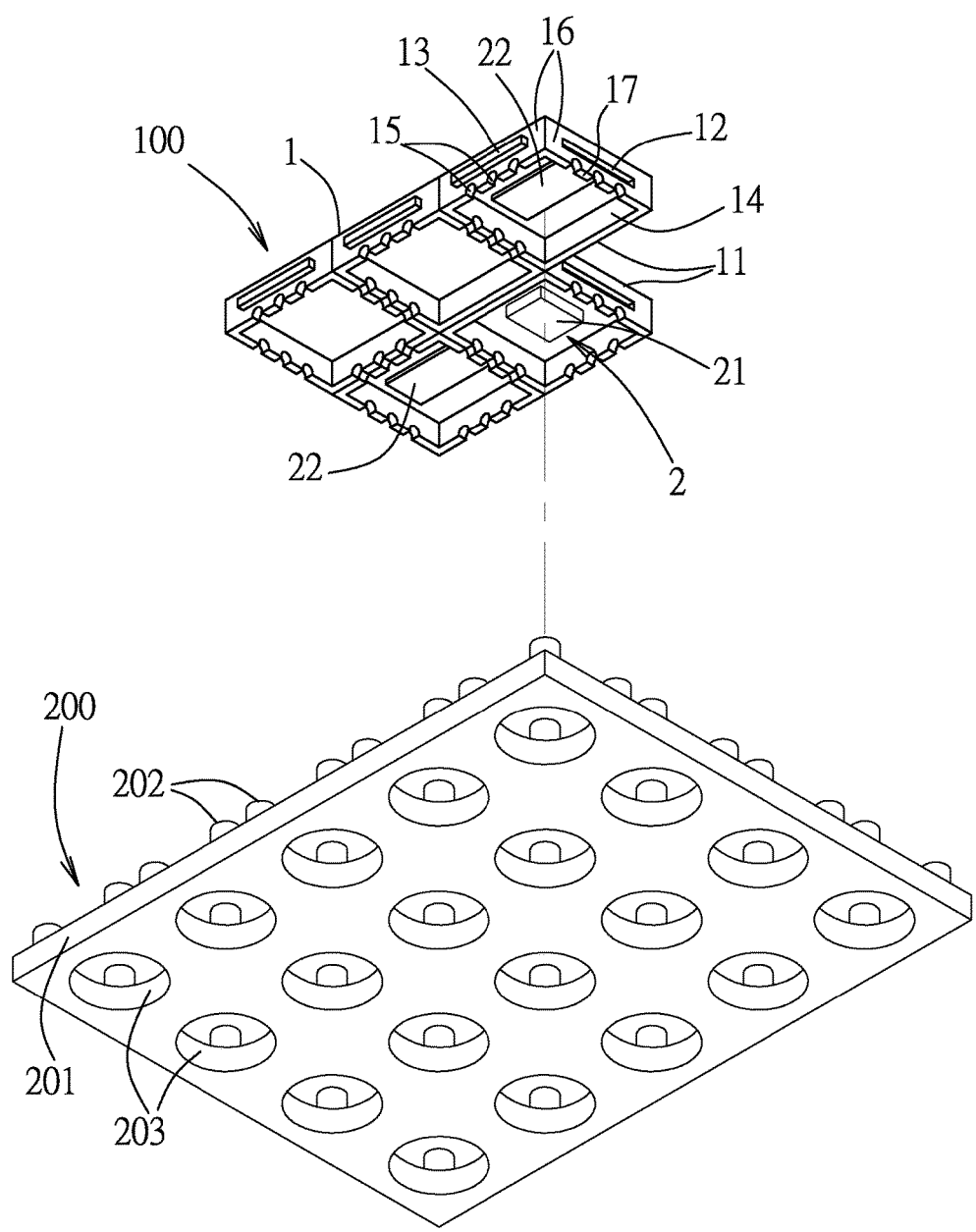
FIG. 3 is an exploded perspective view of the preferred embodiment taken from another angle.

Referring to FIGS. 1 to 3, a temperature measuring board device according to the preferred embodiment of the disclosure is suitable for use in a reflow oven (not shown) and is adapted to cooperate with a temperature measuring device 4 for measuring an oven temperature of the reflow oven. The temperature measuring board device comprises a temperature measuring board 100, and a fixture 200 for supporting and fixing the temperature measuring board 100. The temperature measuring board 100 includes a modular substrate 1, a thermal compensation unit 2 and two retaining mechanisms 3.

The modular substrate 1 includes a plurality of substantially square plate-shaped substrates 11 assembled to each other. Each substrate 11 has two first fixing portions 12, two second fixing portions 13 and a first engaging portion 14. Concretely speaking, the first fixing portions 12 are respectively disposed on two adjacent lateral sides 16 of the substrate 11, and are formed as engaging grooves extending inwardly from the respective lateral sides 16. The second fixing portions 13 are disposed on the other two adjacent lateral sides 16 of the substrate 11 opposite to the first fixing portions 12, and are formed as engaging ribs protruding from the respective lateral sides 16. Because the second fixing portion or engaging rib 13 of one of the substrates 11 can be releasably engaged to the first fixing portion or engaging groove 12 of another one of the substrates 11, a selected number of the substrates 11 can be assembled to each other to form a desired shape of the modular substrate 1. The first engaging portion 14 is configured as a square groove extending inwardly from a bottom side 17 of the substrate 11.

The fixture 200 includes a plate-shaped main body 201, a plurality of second engaging portions 202 disposed on a top side of the main body 201, and a plurality of through holes 203 extending through the top and bottom sides of the main body 201. The first engaging portion 14 of each substrate 11 is removably engaged to a corresponding one of the second engaging portions 202. Each second engaging portion 202 includes four angularly spaced-apart cylindrical abutment studs 2021 projecting from the top side of the main body 201 and surrounding a corresponding through hole 203.

Figure 5:
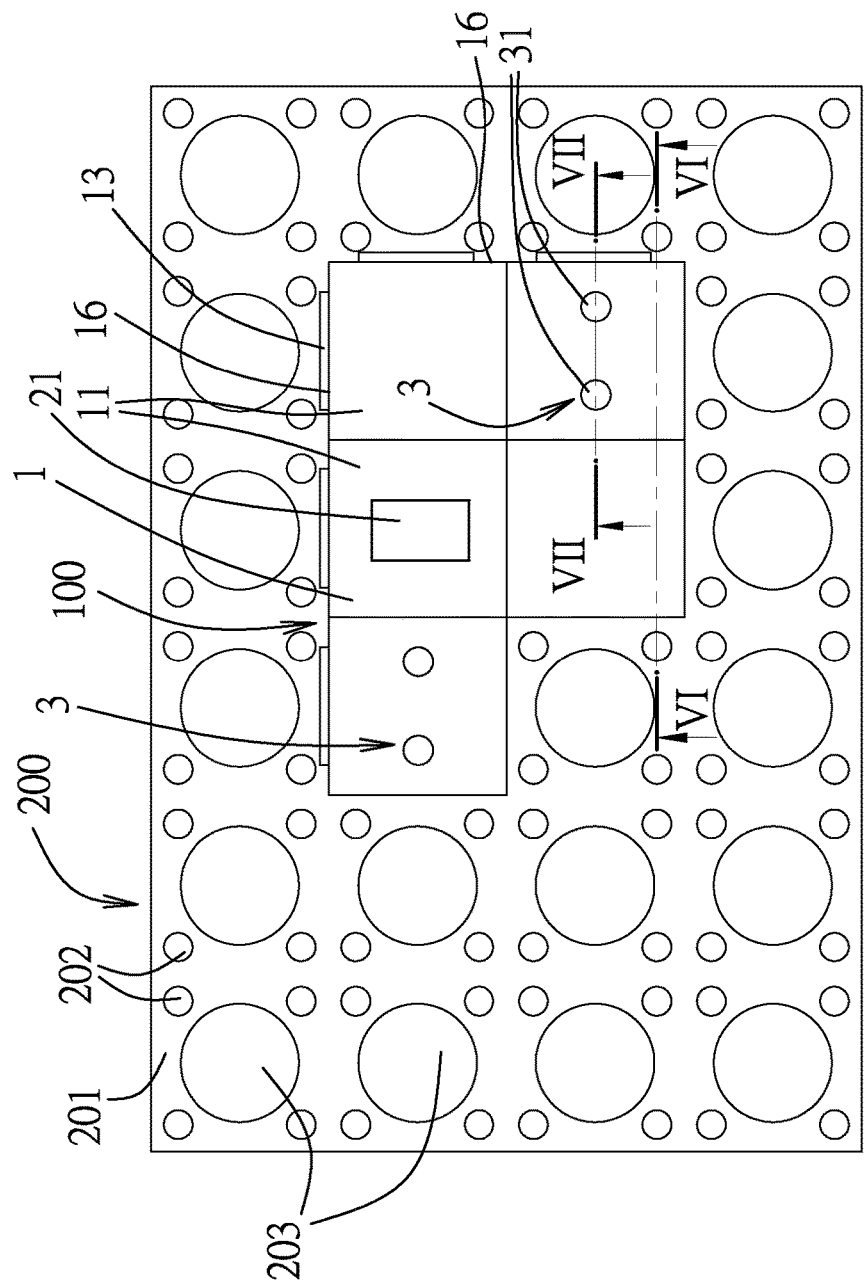
FIG. 5 is a schematic top view of the preferred embodiment.
Figure 6:
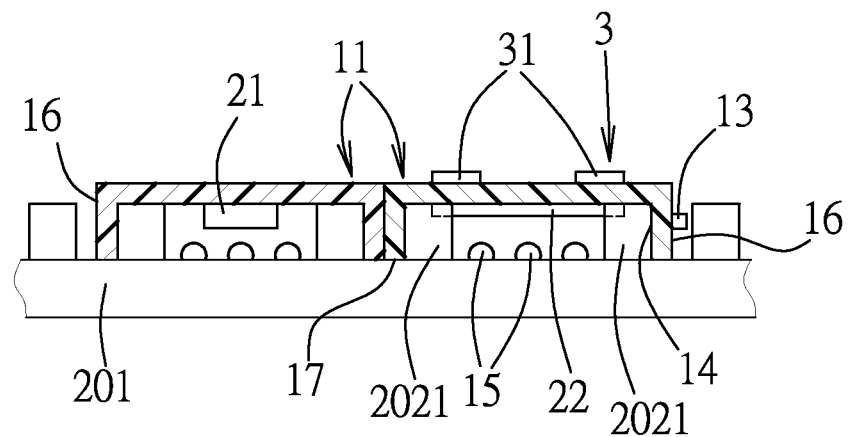
FIG. 6 is a fragmentary sectional view of the preferred embodiment taken along line VI-VI of FIG. 5.

Referring to FIGS. 5 and 6, each substrate 11 is removably engaged to the fixture 200 by engaging the first engaging portion or groove 14 with the corresponding second engaging portion 202 such that the four abutment studs 2021 of the second engaging portion 202 extend engagingly into four corners of the groove 14, thereby fixing each substrate 11 to the fixture 200. A selected number of the substrates 11 can be fixedly assembled to the fixture 200 to form a desired shape of the modular substrate 1.

By using the coordination of the first and second fixing portions 12, 13 and/or the coordination of the first and second engaging portions 14, 202, the substrates 11 can be fixedly assembled to each other and/or to the fixture 200 using a selected number of the substrates 11 to achieve a desired shape. As such, the modular substrate 1 can simulate correspondingly printed circuit boards (not shown) of various sizes and shapes for conducting an oven temperature measurement. If a printed circuit board to be simulated has features, such as holes or broken edges, the modular substrate 1 can be drilled with holes or made with broken edges at positions corresponding to those of the printed circuit board, so that a more accurate measurement of the oven temperature may be achieved.

Figure 4:
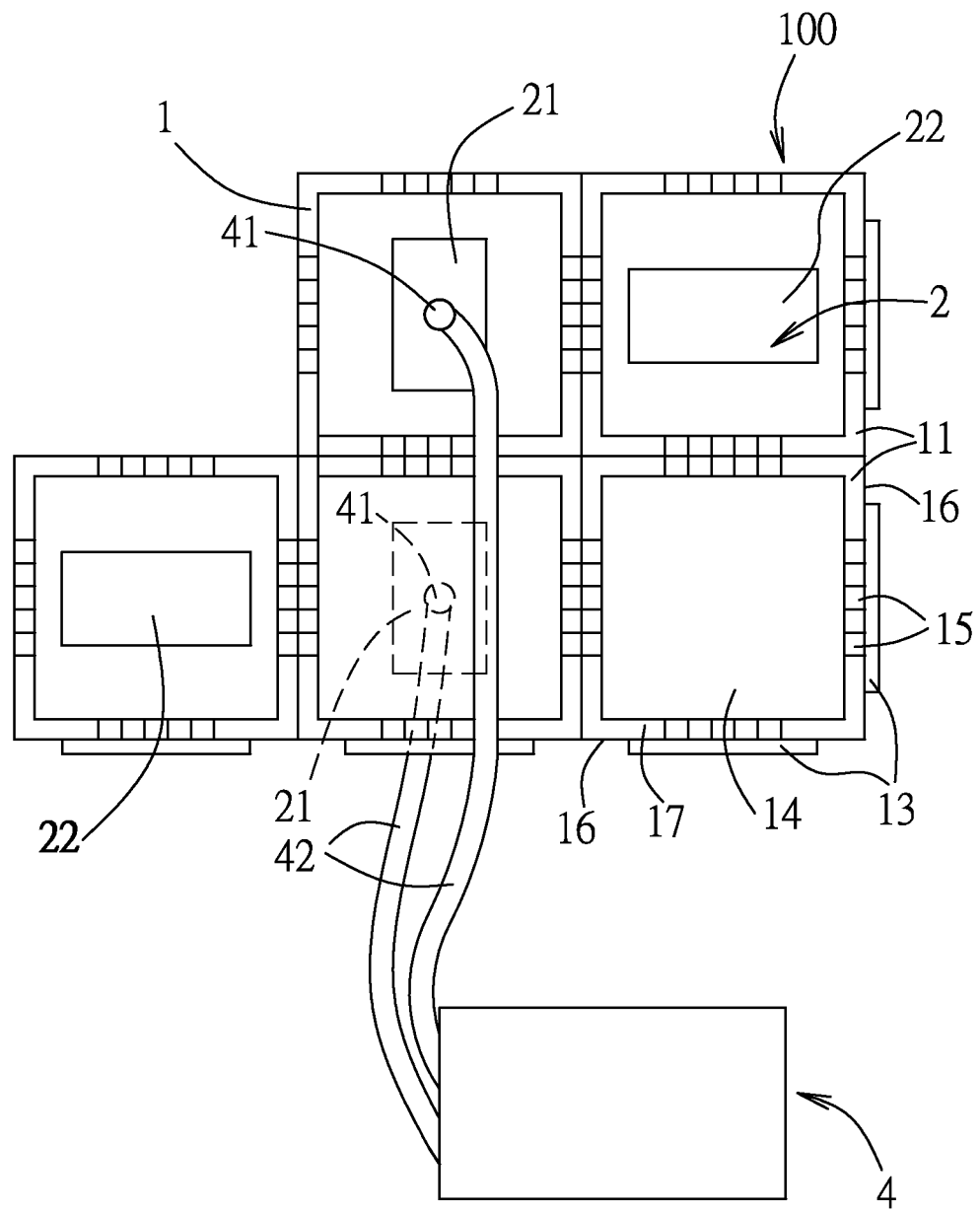
FIG. 4 is a schematic bottom view of a modular substrate of the preferred embodiment.

Referring to FIG. 4, in combination with FIG. 5, the thermal compensation unit 2 includes two surface-measured compensation members 21 and two stacked-layered compensation members 22 all selectively fixed to the modular substrate 1. The surface-measured compensation members 21 are used to compensate and simulate the effect of electronic components, such as electrical connectors, CPU, RAM, etc., that are mounted on the actual printed circuit board during baking of the printed circuit board. In this embodiment, two actual electronic components are directly used as the two surface-measured compensation members 21, and are respectively fixed to the top and bottom sides of the modular substrate 1 by soldering. Because the surface-measured compensation members 21 can be fixed to the modular substrate 1 at selected locations, the temperature measuring board 100 can use each of the surface-measured compensation members 21 to simulate a high thermal mass element or a heat-sensitive element mounted on the printed circuit board. Further, by measuring the oven temperature of the surface-measured compensation member 21, the oven temperature of each electronic component on the actual printed circuit board can be simulated. Hence, the temperature measuring board 100 can be closer to the actual printed circuit board during the temperature measuring simulation.

To enable the temperature measuring board 100 to withstand a repeated baking process without damaging an inner portion thereof, the modular substrate 1 does not have a copper layered structure of an ordinary printed circuit board. To compensate for the lack of the copper layered structure, the stacked-layered compensation members 22 are mounted on the modular substrate 1 to simulate the copper layered structure of the actual printed circuit board. In this embodiment, each of the stacked-layered compensation members 22 is a metal plate made of copper, and is removably received and fixed in the square groove 14 of a corresponding substrate 11 by a respective one of the retaining mechanisms 3. It should be noted that the stacked-layered compensation members 22 are not essential during use of the temperature measuring board 100, they are mounted to the temperature measuring board 100 only when the resulting temperature measured by the temperature measuring board 100 obviously differs from that of the actual printed circuit board due to the copper layered structure thereof.

Referring back to FIGS. 1 and 4, in measuring the oven temperature, the temperature measuring board 100 is put in the reflow oven, and two thermocouples 41 of the temperature measuring device 4 are fixed to the respective surface-measured compensation members 21. Through this, baking of the different electronic components on the actual printed circuit board can be simulated and the temperature measurements can be conducted. It should be noted that, in this embodiment, each side 16 of each substrate 11 is formed with three wire organizing notches 15. The wire organizing notches 15 communicate the groove 14 in each substrate 11 with an ambient environment. The wire organizing notches 15 at one side 16 of one of the substrates 11 are registered with the wire organizing notches 15 at a corresponding side 16 of an adjacent substrate 11 during assembly. Through this, a temperature measuring wire 42 of the temperature measuring device 4 can extend through one of the wire organizing notches 15 into the groove 14 of the corresponding substrate 11 (see FIG. 4) to connect with a respective one of the thermocouples 41. Since the size of each wire organizing notch 15 corresponds to the cross sectional area of the temperature measuring wire 42, the temperature measuring wire 42 can be positioned in the wire organizing notch 15 and can thus be easily handled.

Figure 7:
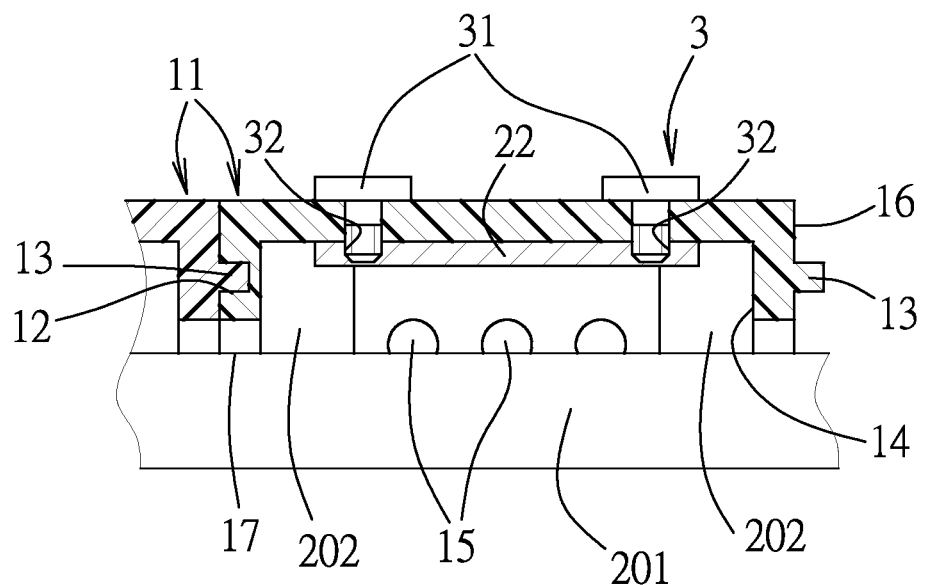
FIG. 7 is a fragmentary sectional view of the preferred embodiment taken along line VII-VII of FIG. 5.

Referring to FIG. 7, in combination with FIGS. 1 and 5, in this embodiment, each retaining mechanism 3 includes two threaded rods 31 extending through a corresponding substrate 1, and two screw holes 32 formed in a corresponding stacked-layered compensation member 22 for threaded engagement with the threaded rods 31. Because the threaded rods 31 are threaded to the respective screw holes 32, the stacked-layered compensation member 22 can be securely fixed within the groove 14 of the corresponding substrate 11. It is worth to mention that the configuration of each retaining mechanism 3 is not limited to the aforesaid disclosure, and may be any mechanism with fixing effect.

Figure 8:
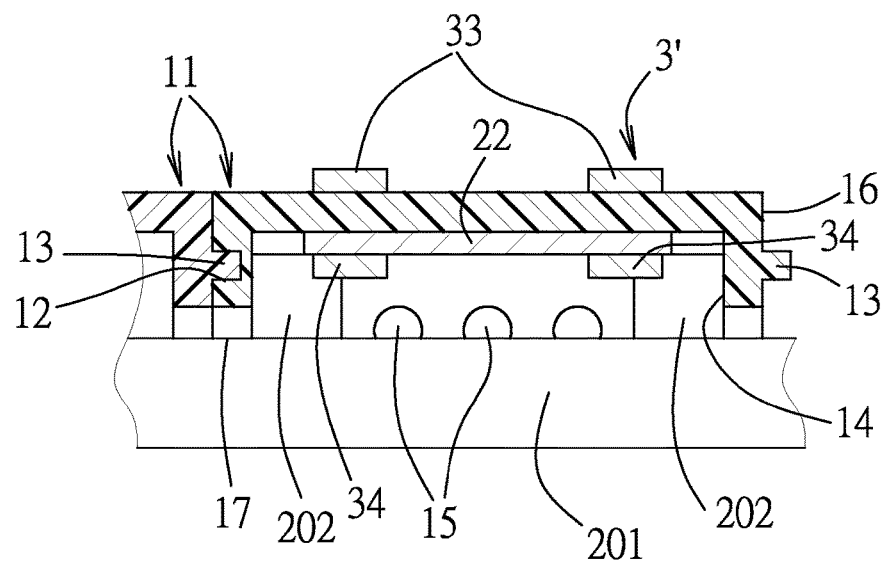
FIG. 8 is a view similar to FIG. 7, but illustrating an alternative form of a retaining mechanism.

In an alternative embodiment, as shown in FIG. 8, the retaining mechanism 3' includes two first magnets 33 mounted on a corresponding substrate 11, and two second magnets 34 disposed on a corresponding stacked-layered compensation member 22 and magnetically attracted to the first magnets 33. Through magnetic attraction between the first and second magnets 33, 34, the stacked-layered compensation member 22 is sandwiched between the second magnets 34 and the corresponding substrate 11, and is thereby securely fixed to the corresponding substrate 11.

Figure 9:
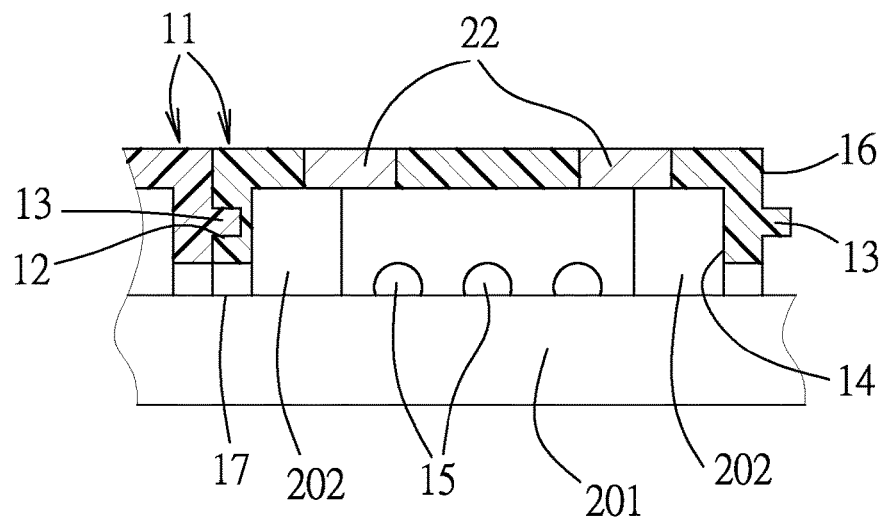
FIG. 9 is a view similar to FIG. 7, but illustrating a temperature measuring board without the retaining mechanism.

It should be noted that the retaining mechanism 3 is not essential for fixing the stacked-layered compensation member 22 to the substrate 1. FIG. 9 illustrates another alternative form of the embodiment. In this embodiment, the retaining mechanism 3 is dispensed herewith, and the stacked-layered compensation member 22 includes two metal pieces fixedly fitted to the corresponding substrate 11.

In order to prolong the service life of the temperature measuring board 100 and to prevent the same from being damaged due to repeated baking processes, the material selected for making the substrates 11 of the modular substrate 1 has a thermal decomposition temperature greater than 320° C. a glass transition temperature greater than 170° C., and a thermal expansion coefficient smaller than 0.0002 m/° C., and does not have a copper layered structure of an ordinary printed circuit board. Thus, during baking, the modular substrate 1 is not likely to break when the temperature exceeds the thermal decomposition temperature, is not likely to soften and deform when the temperature exceeds the glass transition temperature, and is not likely to segregate due to high thermal expansion coefficient or repeated expansion and contraction of the stacked layered structure. In comparison with the ordinary printed circuit board sample which has a service life that can withstand around 50 times of temperature measurements, the service life of the temperature measuring board 100 of this disclosure can withstand up to over 150 times of temperature measurements. Preferably, the material selected for making the modular substrate 1 is one of FR-4 epoxy glass fiber and Stononlead.

In sum, this disclosure uses the modular substrate 1 having a plurality of the substrates 11, and by using the coordination of the first and second fixing portions 12, 13 and/or the coordination of the first and second engaging portions 14, 202, the substrates 11 can be fixedly assembled to each other and/or to the fixture 200 using a selected number of the substrates 11 to achieve a desired shape of the modular substrate 1. Through this, the modular substrate 1 can simulate accurately and correspondingly printed circuit boards (not shown) of various sizes, shapes and thicknesses for conducting an oven temperature measurement. Further, through the disposition of the surface-measured compensation members 21, the temperature measuring board 100 is able to simulate measurement of the oven temperature and affection of each electronic component on the printed circuit board. Moreover, since the inner portion of the modular substrate 1 has no stacked layered structure (copper layer), but has features, such as high thermal decomposition temperature, high glass transition temperature, low thermal expansion coefficient, etc., the modular substrate 1 can withstand many times of repeated baking without being damaged. Therefore, the objects of this disclosure can be achieved.

While the present disclosure has been described in connection with what is considered the most practical and preferred embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A temperature measuring board for use in measuring an oven temperature of a reflow oven, said temperature measuring board comprising:
a modular substrate including a plurality of substrates assembled to each other, each of said substrates having at least one first fixing portion, and at least one second fixing portion removably fixed to said first fixing portion of another one of said substrates, wherein a selected number of said substrates can be assembled to each other to form a desired shape of said modular substrate through engagement of said first and second fixing portions; and
a thermal compensation unit including at least one surface-measured compensation member fixed to said modular substrate at a selected location.

2. The temperature measuring board as claimed in claim 1, wherein said first fixing portion is an engaging groove extending inwardly from a lateral side of a corresponding one of said substrates, and said second fixing portion is an engaging rib protruding from another lateral side of the corresponding said substrate and releasably engaging said engaging groove in an adjacent one of said substrates.

3. The temperature measuring board as claimed in claim 1, wherein said modular substrate has a thermal decomposition temperature greater than 320° C., a glass transition temperature greater than 170° C., and a thermal expansion coefficient smaller than 0.0002 m/° C.

4. The temperature measuring board as claimed in claim 1, wherein the material of said modular substrate is one of FR-4 epoxy glass fiber and Stononlead.

5. The temperature measuring board as claimed in claim 1, wherein each of said substrates is plate-shaped, said first and second fixing portions being formed on two lateral sides of a corresponding one of said substrates.

6. The temperature measuring board as claimed in claim 5, wherein each of said substrates has a groove extending inwardly from a bottom side thereof for receiving a portion of said thermal compensation unit.

7. The temperature measuring board as claimed in claim 6, wherein each of said substrates further includes at least one wire organizing notch that communicates said groove with an ambient environment and that is registered with said wire organizing notch of an adjacent one of said substrates.

8. The temperature measuring board as claimed in claim 1, wherein said thermal compensation unit further includes at least one stacked-layered compensation member removably fixed to said modular substrate at the selected location, said temperature measuring board further comprising at least one retaining mechanism for removably retaining said stacked-layered compensation member to said modular substrate.

9. The temperature measuring board as claimed in claim 8, wherein said retaining mechanism includes at least one threaded rod extending through said modular substrate, and a screw hole formed in said stacked-layered compensation member for threaded engagement with said threaded rod.

10. The temperature measuring board as claimed in claim 8, wherein said retaining mechanism includes at least one first magnet disposed on said modular substrate, and a second magnet disposed on said stacked-layered compensation member and magnetically attracted to said first magnet.

11. The temperature measuring board as claimed in claim 8, wherein said stacked-layered compensation member is a metal piece fitted to said modular substrate.

12. A temperature measuring board device for use in measuring an oven temperature of a reflow oven, said temperature measuring board device comprising:
a temperature measuring board including a modular substrate and a thermal compensation unit, said modular substrate including a plurality of substrates assembled to each other, each of said substrates having a first engaging portion, said thermal compensation unit including at least one surface-measured compensation member fixed to said modular substrate at a selected location; and
a fixture supporting and fixing said temperature measuring board, and including a main body and a plurality of second engaging portions disposed on said main body;
wherein said first engaging portion of each of said substrates is removably engaged to a corresponding one of said second engaging portions, and wherein a selected number of said substrates can be assembled to said fixture to form a desired shape of said modular substrate.

13. The temperature measuring board device as claimed in claim 12, wherein each of said substrates further has at least one first fixing portion, and at least one second fixing portion removably fixed to said first fixing portion of another one of said substrates.

14. The temperature measuring board device as claimed in claim 12, wherein said fixture is formed with a plurality of through holes extending through said main body.

15. The temperature measuring board device as claimed in claim 12, wherein said modular substrate has a thermal decomposition temperature greater than 320° C., a glass transition temperature greater than 170° C., and a thermal expansion coefficient smaller than 0.0002 m/° C.

16. The temperature measuring board device as claimed in claim 12, wherein the material of said modular substrate is one of FR-4 epoxy glass fiber and Stononlead.

17. The temperature measuring board device as claimed in claim 12, wherein each of said substrates is plate-shaped, said first engaging portion being a groove extending inwardly from a side of a respective one of said substrates that is adjacent to said fixture, each of said second engaging portions being an abutment stud that projects from said main body and that is engaged to said groove of a corresponding said substrate.

18. The temperature measuring board device as claimed in claim 17, wherein said groove receives a portion of said thermal compensation unit, each of said substrates further having at least one wire organizing notch that communicates said groove with an ambient environment and that is registered with said wire organizing notch of an adjacent one of said substrates.

19. The temperature measuring board device as claimed in claim 12, wherein said thermal compensation unit further includes at least one stacked-layered compensation member removably fixed to said modular substrate at the selected location, said temperature measuring board further including a retaining mechanism for removably fixing said stacked-layered compensation member to said modular substrate.

20. The temperature measuring board device as claimed in claim 19, wherein said retaining mechanism includes at least one threaded rod extending through said modular substrate, and a screw hole formed in said stacked-layered compensation member for threaded engagement with said threaded rod.

21. The temperature measuring board device as claimed in claim 19, wherein said retaining mechanism includes at least one first magnet disposed on said modular substrate, and a second magnet disposed on said stacked-layered compensation member and magnetically attracted to said first magnet.

22. The temperature measuring board device as claimed in claim 19, wherein said stacked-layered compensation member is a metal piece fitted to said modular substrate.

* * * * *